2,936,244

TALL OIL LINOLEUM

Joseph W. Ayers, Easton, Pa., assignor to J. W. Ayers & Co., Easton, Pa., a corporation of Delaware No Drawing. Application June 30, 1955
Serial No. 519,225

21 Claims. (Cl. 106—123)

This invention relates to linoleum compositions and compounds in the form of floor and wall coverings as sheets, tiles and the like and for artistic and wear-resistant coatings and other purposes, and to processes for making such products.

At the present time, linoleum compounds are commonly made by mixing together linseed or other drying oil, tall oil (especially refined grades having high rosin content), pentaerythritol or other polyhydric alcohol, litharge and other minor ingredients, next heating the mixture and blowing the same with air until the viscosity increases and a plastic cement is formed and then incorporating fillers, pigments and colors in the mass, thereby forming a compound capable of being sheeted.

Although the floor and wall coverings made from these linoleum compounds are hard and adequately flexible and have good wearing qualities under dry conditions, they are lacking in durability under the action of continuous dampness or the action of alkali left from scouring with soap and water.

A primary object of the present invention is to produce linoleum compositions which are superior to the known compositions not only in resistance to water and alkali but also in over-all quality, and which furthermore, can be produced at a lower cost.

The invention in its broadest concept may be most easily understood from a comparison of the same with the conventional method of producing linoleum compounds. Under prior commercial practice, the rosin in the tall oil is partially esterified with pentaerythritol or other polyol and is mixed with the linseed or other drying oil and driers, after which the mixture is heated and oxidized by air-blowing in Bedford kettles. A typical plastic cement, known as a Taylor cement, obtained in this manner is composed of 23–25% rosin and 77–75% esters of fatty acids. This cement is then mixed with about twice its weight of a mixed filler of wood flour, whiting and other compounding ingredients to form a mastic which is later sheeted to produce the linoleum.

The linoleum compositions of the present invention can be prepared by altering such processes through the substitution of tall oil for the linseed oil, or for substantially all of it, and incorporating in the cement mix a small quantity of an aluminum alcoholate or derivative thereof classifiable as an "acid acceptor." The aluminum compound modifies the tall oil and apparently serves among other functions as a cross-linking agent for the various components present and those formed during oxidation at their carboxyl and hydroxyl groups, and provides not only a compound of the desired properties for fabricating linoleum but also enhances the binding action in the ultimate linoleums which imparts the excellent qualities hereinafter brought out.

Within the broad definition set out above, the aluminum compounds utilizable under the invention may be defined by the formula:

wherein X is an alcoholate, a phenolate or an acylate radical; Y and Z each is an alcoholate, a phenolate or an acylate radical, or, are an =O atom together; and Y may be an OH group when only one of X and Z is an acylate radical.

The alcoholate, phenolate and acylate radicals attached to the aluminum atom may contain a hydrocarbon chain of any number of carbon atoms of any configuration, and such chain may be unsubstituted or it may be substituted with non-functional groups or with functional groups as hydroxy, carboxy, ester, ether and keto groups. Thus the radicals attached to the aluminum atom may be derived from glycols, from enolizing organic compounds such as keto esters and diketones, from dicarboxylic acids or anhydrides including phthalic acid and from compounds containing mixtures of said radicals.

Not only may the monomers of the compounds be employed but also the polymers of the same where they exist.

Although experimentation indicates that the described aluminum compounds are operable as a class in the linoleum products of the invention, the individual aluminum compounds within the class are in no sense equal in their ability to impart the highly desirable qualities in the linoleum products. The preferred aluminum alcoholate compounds and derivatives are those which are not so highly reactive as to interfere with the control of the oxidation during blowing, these compounds being those containing one or more higher molecular radicals as acyl, keto ester or alkoxy groups of six or more carbon atoms. In these compounds one active group on the aluminum atom may provide adequate reaction.

A highly effective group of aluminum compounds may be defined as hydroxy, alkoxy aluminum acylates, which compounds are described in the copending application of Jacobus Rinse, Serial No. 495,765, filed March 21, 1955. The corresponding hydroxy, phenoxy aluminum acylates are also described therein. The alkoxy group attached to the aluminum atom is described as being either normal or iso and to be produced preferably from lower molecular alcohols. In addition, cresoxy groups are mentioned as well as other phenoxy groups of relatively low boiling phenols. The acylate radical is described as being produced from any monocarboxylic acid including unsaturated and saturated fatty acids, from formic to stearic acid. Also cycloaliphatic acids such as the naphthenic acids and hexahydrobenzoic acid are disclosed; also aromatic acids such as benzoic acid, simple acetic acid and finally abietic acid and other rosin acids. Polymers of the aluminum alcoholate compounds, obtained simply by heating to temperatures at which alcohol is liberated, may also be used in the linoleum compounds of the invention, for such polymers split in the presense of the acid in the cement and provide the required activity.

Liquid compounds of this class, such as hydroxy, isopropoxy aluminum oleate, are most suitable, for they are easier to handle and mix more readily with the other ingredients, thereby providing uniform distribution throughout the cement and decreasing the tendency for localized action, this condition being desirable if not essential in obtaining uniform reaction throughout the mass.

The oxo-aluminum acylate derivatives of aluminum alcoholates are described in the co-pending application of Jacobus Rinse, Serial No. 533,235, filed September 8, 1955, based on the Dutch application No. 190,684, filed September 11, 1954. Here compounds derived from aluminum alcoholates are described having the formula RCOO—Al=O, in which R is any alkyl group, the acyl radical corresponding to or being derived from any carboxylic acid, normal or branched, saturated or unsaturated and of any number of carbon atoms, the most important being those compounds containing acylates of higher fatty acids such as oleic acid and stearic acid, Other types of operable alcoholates may be defined as alkoxy aluminum acylates including dialkoxy aluminum monoacylates and monoalkoxy aluminum diacylates and the corresponding phenoxy compounds, which compounds are described in the application of Jacobus Rinse, Serial No. 489,777, filed February 21, 1955. In this application it is disclosed that the alkoxy and phenoxy groups may be derived from or corresponding to the same alcohols and phenols hereinbefore described with reference to the hydroxy alkoxy aluminum acylates and their corresponding phenoxy compounds. The acylate radicals described in this application may correspond to carboxylic acids of the type hereinbefore described. Polymers of these oxo-aluminum acylates may be used instead of the monomers.

Collectively considered, the above described preferred types of aluminum compounds may be referred to as active aluminum alcoholates and derivatives containing one or more substituents on the aluminum atom which impart stability thereto in the compounding operations at room and normal operating temperatures, and inhibits premature reaction or localized reactions.

Simple aluminum alcoholates of both low, medium and high molecular alcohols may be used, as aluminum isopropylate and aluminum oleylate, but the high reactivity of the lower members at normal temperatures interferes with their effectiveness and puts undesirable limitations on their use as to quantities and compounding conditions. Simple aluminum triacylates $(Al(Ac)_3)$ of low and medium length carbon chains are acid acceptors and also can be used, examples being the triacetate and the trioctoate.

Tall oil products of commerce as a class can be employed. Examples of suitable refined tall oils are those containing about 45% rosin content, and also those containing as low as 1 to 2% rosin, produced by fractionation. Better results are generally obtained when the rosin content is from 15 to 30%, the preferred amount being 22 to 25%. Tall oil of the preferred rosin content is suitably obtained by using mixtures of the commercially available high rosin content tall oil products with low rosin content tall oil products.

The acid content of the tall oil in the preferred embodiments of the invention is at least partially neutralized by the addition of pentaerythritol, glycerin, sorbitol, methyl glucoside or other polyol, in accordance with the general practice in linoleum cement production from linseed oil mixtures. The amount of polyalcohol may be varied within wide limits. Although alcohol in the amount of 20–25% of the equivalent, i.e. of the amount of alcohol theoretically required to esterify all of the acid present, produces good products and is economically feasible, proportions as high as 50% frequently impart better quality to the products. Amount as low as 5% are advantageous, but the quality of the final product is not as good. The amount of esterification to be effected is influenced by the acid number of the tall oil used and this acid number may be as high as 100, but better results are obtained when the acid number is within the range of 20 to 60, the preferred range being 25 to 30.

If a cheaper grade of linoleum is to be produced, unesterified tall oil may be used instead of the esterified product and the linoleum obtained will still possess properties comparing favorably with an accepted grade produced and sold commercially at the present time.

The aluminum compounds herein described are also effective when compounded with waste fatty acid materials of industry, as those obtained from soap stock and those from linseed oil purification. Either of these materials can be used to replace a substantial part of the tall oil in the compositions of the invention and the waste linseed oil material can be used to replace all or substantially all of the tall oil.

The amount of aluminum compound incorporated in the linoleum cements of the invention may be varied within wide limits depending upon the chemical structure of the tri-functional aluminum compound. The amount used can be as low as 0.1 of one percent of the tall oil content. The maximum beneficial amount appears (theoretically) to be approximately 1:1 in relation to the esterified tall oil. For economic reasons the minimum amount necessary to impart the desired action is used.

The preferred method of incorporating the aluminum compound into the other ingredients involves introducing the same into the esterified tall oil mass prior to blowing. The aluminum compound appears to react during the blowing and serves to improve the quality of the cement made from the tall oil, and to improve the final quality of the linoleum produced therefrom. Substantial improvement, however, can also be obtained by adding the aluminum compound to the linoleum cement after the blowing is either partially or wholly completed. The highly active alcoholates may have to be added at a later time to avoid premature reaction. Also they may require dilution with a solvent and/or strenuous agitation to accomplish thorough or homogeneous dispersion.

No novelty is involved in the selection of driers or the pigments, for conventional compounds and mixtures can be used. Satisfactory fillers include wood flour, nut shell flour, alpha cellulose; asbestos whiting, hydrous calcium sulfate, magnesium silicates, as asbestine, slate flour, diatomacious silica, precipitated calcium carbonate, calcium silicate and aluminum hydroxides. Generally the filler content in the linoleum compound may amount to 55 to 75%, the rest being the binder.

The invention is illustrated by the compositions and test data set forth in the examples and tables hereinafter set out. The general procedure used in producing the linoleum compounds was as follows:

The tall oil or mixture of tall oils are introduced into a closed vessel equipped with stirrer, reflux condenser and gas sparger and heated to 180° C. while gas (carbon dioxide or nitrogen) is slowly introduced. At this temperature the polyhydric alcohol is introduced as fast as foaming permits and the heating is continued to raise the temperature to 260° C. which temperature is maintained while gas is flowed in at a somewhat increased volume, this treatment being continued until the mass reaches the required acid number. Thereupon the mixture is cooled to 220° C. and the drier or mixture of driers is added during stirring. Thereupon the mixture is cooled to 100° C. during the slow introduction of gas.

Other methods and procedures for esterifying tall oil may be employed and will to some extent depend on the type and amount of polyol used. In some cases azeotropic methods may be used, but these require the elimination of the solvent employed prior to the blowing operation.

The resulting mass was then blown at a temperature of 180–185° F. and at a pressure of 5 p.s.i. at an air volume of 0.05 c.f.m. per pound of ester or under other conventional conditions until gellation occurred thereby providing the linoleum cements. These cements were then mixed with the pigments and other additives and subjected to the action of a 2-roll mill at normal operating temperatures and the resulting compounds were sheeted and made into 6 x 6 inch samples. These samples were then cured at 180° F. until they showed on test a fresh dent of 7% or less. Thereupon the samples were subjected to the usual tests for dry abrasion, wet abrasion, alkali resistance, water resistance, flexibility and dent. For comparative purposes linoleum samples were prepared using a linseed-rosin mixture essentially of the Taylor type containing 77% fatty acid esters and 23% rosin ester (acid number 15), the blow time used being 29 hours. This cement was compounded into a linoleum sample in the same way as the cements were used in forming the samples of the invention, with the pigments as shown in the tables, this comparative sample being referred to as the "Standard."

ESTER COMPOSITIONS

| Ester Composition | A | B | C |
|---|---|---|---|
| Tall Oil A [1] | 1,320 | 1,320 | |
| Tall Oil B [2] | | | 1,320 |
| Tall Oil C [3] | | | 600 |
| Pentaerythritol (Technical) | 660 | 660 | 130 |
| Litharge | 270 | 300 | |
| Manganese Resinate (6%) | 18.3 | 16.8 | 6 |
| Viscosity, G and H | 7.0 | 0.88 | 6.7 |
| Color, G and H | X | Z | V |
| A.N | 9 | 8 | 7 |
| | 17.5 | 11 | 54 |

[1] Distilled tall oil, 45% rosin.
[2] Refined tall oil, 2% rosin.
[3] Refined tall oil, 98-99% fatty acid (½ linoleic and ½ oleic), 1-2% rosin.

CEMENTS

| Cement | A | B | C | D |
|---|---|---|---|---|
| Ester Composition A | 700 | 600 | | |
| Ester Composition B | | | 600 | |
| Ester Composition C | | | | 600 |
| Aluminum Cross-Linking Agent | [1] 35 | [2] 33.3 | [1] 30 | [1] 30 |
| Blow Time—hrs | 42.5 | 22 | 48 | 68 |
| Consistency | ([3]) | ([4]) | ([5]) | ([6]) |

[1] Hydroxy isopropoxy aluminum oleate.
[2] Oxo-aluminum oleate (in 10% mineral spirits).
[3] Dry—very tough.
[4] Tough—dry.
[5] Tough—very dry.
[6] Very tough—hard.

LINOLEUM COMPOUNDS

| Ex. No | 1 | 2 | 3 | 4 | 5 | 6 | Standard |
|---|---|---|---|---|---|---|---|
| Cement A | 133 | | | | | | |
| Cement B | | 133 | | | | | |
| Cement C | | | 133 | 199 | | | |
| Cement D | | | | | 106 | 80 | |
| Standard | | | | | | | 133 |
| Wood Flour | 123 | 123 | 123 | | 98 | | 123 |
| Whiting | 105 | 105 | 105 | 209.5 | 84 | | 105 |
| TiO₂ | 18 | 18 | 18 | 27 | 14.5 | 10.5 | 18 |
| Asbestos | | | | 296.5 | | 72 | |
| CaCO₃ | | | | 100 | | | |
| Al(OH)₃ | | | | | | 92 | |
| CaSO₄ | | | | | | 12 | |
| Percent Binder | 35 | 35 | 35 | 23.9 | 30 | 30 | 35 |
| Cure Time (days) | 5 | 5 | 4.5 | 3 | 5 | 2 | 7 |
| Percent Dent (Fresh) | 5.3 | 6.5 | 6.5 | 1.1 | 6.2 | 1.8 | 6 |
| Percent Dent (Residual) | 3.3 | 2.8 | 2.8 | 0 | 3.14 | 1.0 | 3.2 |

WEAR-DRY ABRASION BY MODIFIED GORDEN ABRASION TESTER—1/0 EMERY CLOTH

| Ex. No | 1 | 2 | 3 | 4 | 5 | 6 | Standard |
|---|---|---|---|---|---|---|---|
| Start [1] | .0536 | .052 | .0520 | .0557 | .0496 | .0543 | .0488 |
| 1,000 [2] | .0533 | .0518 | .0514 | .0552 | .0496 | .0543 | .0479 |
| 5,000 | .0525 | .0510 | .0497 | .0538 | .0494 | .0539 | .0460 |
| 10,000 | .0509 | .0502 | .0490 | .0520 | .0493 | .0535 | .0448 |
| 15,000 | .0496 | .0490 | .0479 | .0510 | .0490 | .0528 | .0440 |
| Percent Loss [3] | 7.45 | 5.95 | 7.88 | 8.42 | 1.21 | 2.76 | 9.8 |

[1] Gauge setting at start of test.
[2] Number of strokes of abrasion on specimen surface.
[3] Loss in gauge by dry abrasion.

WEAR-WET ABRASION WITH STIFF BRUSH WORKING IN 1% NaOH

| Ex. No | 1 | 2 | 3 | 4 | 5 | 6 | Standard |
|---|---|---|---|---|---|---|---|
| Start [1] | .0520 | .0500 | .0526 | .0475 | .0489 | .0547 | .0466 |
| 1,000 [2] | .0520 | .0500 | .0524 | .0475 | .0493 | .0547 | .0463 |
| 5,000 | .0520 | .0500 | .0537 | .0474 | .0499 | .0548 | .0483 |
| 10,000 | .0522 | .0505 | .0550 | .0473 | .0515 | .0544 | .0502 |
| Percent Loss [3] | | | | 0.42 | | 0.55 | |
| Percent Gain [4] | 0.38 | 1.0 | .45 | | 5.3 | | 7.7 |

[1] Gauge setting at start of test.
[2] Number of strokes of abrasive on specimen surface.
[3] Percent loss in gauge by abrasive action.
[4] Percent increase in guage by swelling during abrasion.

ALKALI RESISTANCE IN SPOT TEST 1% AQUEOUS NaOH

| Ex. No | 1 | 2 | 3 | 4 | 5 | 6 | Standard |
|---|---|---|---|---|---|---|---|
| Start [1] | .0520 | .0440 | .0500 | .0495 | .0525 | .0525 | .0530 |
| ½ hr | .0520 | .0440 | .0500 | .0495 | .0530 | .0525 | .0505 |
| 2½ | .0485 | .0430 | .0430 | .0495 | .0465 | .0525 | .0370 |
| 4½ | .0470 | .0415 | | | | | .0255 |
| 5 | | | .0340 | .0495 | .0320 | .0525 | |
| 7 | | | | | .0220 | .0515 | |
| 10½ | .0320 | .0400 | | | | | |
| 19 | | | .0250 | .0495 | | | |
| 24 | | | | | | .0475 | |
| Percent Loss [2] | 58 | 9.1 | 50 | 0 | 100 | 9.5 | 100 |

[1] Gauge setting at start of test.
[2] Percent loss in gauge during test.

FLEXIBILITY USING MANDRELS

| Ex. No | 1 | 2 | 3 | 4 | 5 | 6 | Standard |
|---|---|---|---|---|---|---|---|
| Mandrel [1] | 1¼ | 1½ | 1 | 1 | 1 | 1½ | 1¼ |
| Mandrel [2] | 1¼ | 1¾ | 1 | 1 | | | 1½ |

[1] Using fresh sample.
[2] Using sample aged one month.

INDENTATION UNDER STANDARD TEST USING 0.281 DIAMETER PIN

| Ex. No | 1 | 2 | 3 | 4 | 5 | 6 | Standard |
|---|---|---|---|---|---|---|---|
| Percent Dent [1] | 5.3 | 5.1 | 6.5 | 1.1 | 6.2 | 1.8 | 6.0 |
| Percent Residual Dent [2] | 3.3 | 4.3 | 2.8 | 0 | 3.1 | 0.9 | 3.2 |

[1] Immediate.
[2] Recovery after 10 minutes.

WATER RESISTANCE SAMPLES IMMERSED IN WATER FOR 24 HOURS

| Ex. No | 1 | 2 | 3 | 4 | 5 | 6 | Standard |
|---|---|---|---|---|---|---|---|
| Percent absorbed [1] | 2.9 | 3.1 | 5.0 | 1.2 | 4.3 | 1.1 | 4.3 |

[1] Percent gain in weight by water absorption.

ALKALI IMMERSION SAMPLES IMMERSED IN 1% AQUEOUS NaOH SOLUTION

| Ex. No | 1 | 2 | 3 | 4 | 5 | 6 | Standard |
|---|---|---|---|---|---|---|---|
| Failure Hours [1] | 7 | 7 | 7 | [2] 24 | 5 | [2] 24 | [3] 4 |

[1] Failure in hours (approximately) by softening or disintegrating.
[2] Unaffected in 24 hours.
[3] Disintegrated.

The significant differences in the content of the linoleum compounds of the foregoing examples are as follows:

Examples 1, 2, 3 and 5 contain a filler or pigment content composed of organic and inorganic components in substantially equal amounts. Examples 4 and 6 employ inorganic pigments exclusively.

Examples 1–4 employ substantially equivalent amounts of pentaerythritol for reaction with the acids, whereas Examples 5 and 6 employ only one-half the equivalent amount. Other differences include variations in rosin content, in the cross-linking agent used, in the pigments added and in the proportions used.

The tests applied to the various samples produced as hereinbefore recorded show that highly satisfactory linoleums may be produced from esters of tall oil in the absence of linseed or other such drying oil provided a small amount of the aluminum cross-linking agents herein described are added. The general effect of the presence of these agents is to permit a shorter blowing period, a faster curing rate and to provide better flexibility in most formulations.

With further reference to the recorded tests it will be noticed that the tested samples of Examples 1, 2, 3 and 5 containing an organic filler compared very favorably with the sample of Standard linoleum produced from more expensive linseed oil and were very much superior in the wet abrasion and alkali resistance tests. The sample of Example 5 having only a 30% binder content was also considerably better in the dry abrasion test. This formulation is quite inexpensive while at the same time it is equivalent to or better than a conventional oil-rosin binder type linoleum in all respects. It will also be observed that the tested samples of Examples 4 and 6 containing only inorganic pigments were much superior to the Standard in alkali resistance and water resistance. The linoleum samples of these two examples possessed extremely smooth surfaces and the sheets had surprisingly higher strength with low (24–30%) cement binder content. The samples of these two examples cured very fast and hardened to a condition testing very low percentage dents.

It will also be observed that the samples from each of the examples possessed better resistance in dry abrasion wear test as well as the wet abrasion wear test, those of Examples 1 and 2 being best.

With the exception of the sample of Example 5, the alkali resistance of the other samples was much superior to the sample of the Standard linoleum. The samples of Examples 4 and 6 containing only the mineral fillers were extremely resistant to alkali. All of the samples showed satisfactory flexibility and many of them showed better flexibility than the Standard. The indentation tests of all of the samples were satisfactory and some of them were superior to the Standard. The percent dents in Examples 4 and 6 containing only the mineral filler were very good. The water resistance of all samples was satisfactory and was superior to the Standard as to most of them. The samples of Examples 4 and 6 were very good in this respect. Also, the samples of Examples 1, 3, 4, 5 and 6 had a much smoother, glossy surface than the Standard though calendered under the same conditions, the improvement apparently being due to the wetting properties of the linking agent. Finally, all the samples were lighter in color than the Standard, although the baking and curing were carried out under identical conditions.

The effectiveness of the aluminum compounds of the invention for the production of a lower grade linoleum of commercial quality is illustrated by the following example:

*Example 7*

A mixture was made of 400 parts of tall oil (45% rosin), 200 parts of tall oil (2% rosin), 30 parts hydroxy, isopropoxy aluminum oleate, 4.8 parts of litharge, and 0.5 part of manganese resinate (6%). No pentaerythritol or other polyol was added. The mixture was blown until a stiff gel was obtained. Thereupon 78 parts of the resulting mass was worked with additions of 72 parts of wood flour, 62 parts of whiting and 10.7 parts of $TiO_2$. Linoleum sheets were produced therefrom. Compared with the high quality Standard described in the tables hereinbefore set out, this low cost linoleum was superior in dry wear and although inferior in other respects, it had properties of sufficiently good quality to meet the requirements of certain commercial applications.

A general advantage of the present invention is that a linoleum producer has considerable latitude in formulation whereby linoleum products varying from high grade to very low grade can be produced, and always at a low cost in relation to the prior commercial products.

It should be understood that the present invention is not limited to the specific procedures, processing conditions, reactants or fillers herein disclosed but that it extends to all equivalents which will occur to those skilled in the art upon considertaion of the scope of the claims appended hereto.

I claim:

1. Linoleum compounds, the oxidized oil content of which consists essentially of oxidized tall oil chemically modified by the action of an aluminum compound selected from the group consisting of hydroxy, R-oxy aluminum acylates, oxo-aluminum acylates and their polymers obtained by heating the same, said R-oxy groups being selected from the group consisting of alkoxy radicals and phenoxy radicals, the proportion of aluminum compound used being from 0.1% up to a ratio of approximately 1:1 in relation to the weight of the tall oil content.

2. The linoleum compounds of claim 1 wherein the tall oil used has been esterified with a polyhydric alcohol to the extent of at least five percent of the equivalent.

3. Linoleum compounds, the oxidized oil content of which consists essentially of oxidized tall oil-polyol ester composition having an acid number within the range of 20 to 60, chemically modified by the action of a cross-linking agent selected from the group consisting of the compounds defined in claim 1.

4. Linoleum compounds, the oxidized oil content of which consists essentially of oxidized tall oil having initially a rosin content within the range of 15 to 30% which tall oil has been esterified at least in part with a polyol and reacted with a cross-linking agent selected from the group consisting of the compounds defined in claim 1.

5. Linoleum compounds, the oxidized oil content of which consists essentially of oxidized tall oil esterified at least in part with a polyol and chemically modified by reaction with a hydroxy-, alkoxy-aluminum acylate.

6. Linoleum compounds, the oxidized oil content of which consists essentially of oxidized tall oil esterified at least in part with a polyol and chemically modified by reaction with a hydroxy-, alkoxy-aluminum oleate.

7. Linoleum compounds, the oxidized oil content of which consists essentially of oxidized tall oil esterified at least in part with a polyol and chemically modified by reaction with hydroxy-, isopropoxy aluminum oleate.

8. Linoleum compounds, the oxidized oil content of which consists essentially of oxidized tall oil esterified at least in part with a polyol and chemically modified by reaction with an oxo-aluminum acylate.

9. Linoleum compounds, the oxidized oil content of which consists essentially of oxidized tall oil esterified at least in part with a polyol and chemically modified by reaction with an oxo-aluminum oleate.

10. Linoleum compounds, the oxidized oil content of which consists essentially of oxidized tall oil esterified at least in part with a polyol and chemically modified by reaction with a cross-linking agent selected from the group consisting of the compounds defined in claim 1, and having a pigment content of both organic and inorganic fillers.

11. Linoleum compounds, the oxidized oil content of which consists essentially of oxidized tall oil esterified at least in part with a polyol and reacted with a cross-linking agent selected from the group consisting of the compounds defined in claim 1, and having a pigment content composed substantially only of inorganic filler.

12. Linoleum compounds, the oxidized oil content of which consists essentially of oxidized tall oil having initially a rosin content within the range of 15 to 30% which tall oil has been esterified at least in part with a polyol and reacted with a cross-linking agent selected from the group consisting of the compounds defined in claim 1, and having a pigment content composed substantially only of inorganic fillers.

13. Linoleum compounds, the oxidized oil content of which consists essentially of oxidized tall oil esterified at least in part with a polyol and reacted with a hydroxy-, alkoxy-aluminum acylate, and having a pigment content composed substantially only of inorganic fillers.

14. Linoleum sheets and tiles containing a cement consisting essentially of an oxidized reacted mixture of refined tall oil, a polyol and a cross-linking agent selected from the group consisting of the aluminum compounds defined in claim 1, the aluminum atoms of said compounds having thereon a stabilizing substituent radical which inhibits premature reaction of the aluminum compound.

15. Linoleum sheets and tiles containing a cement consisting essentially of an oxidized reacted mixture of refined tall oil having 15 to 30% rosin, a polyol in a quantity which provides an acid number of from about 20 to 60 and a small amount of a hydroxy-, alkoxy-aluminum acylate serving as a linking agent for hydroxy and carboxylic groups in the oxidized tall oil ester mass.

16. In the production of linoleum cements by the oxidation of tall oil-polyol esters, the improvement comprising adding to said esters a compound selected from the group consisting of the compounds defined in claim 1 and reacting said aluminum compound with hydroxy and carboxylic groups in said oxidized ester cement.

17. In the production of linoleum cements by the oxidation of tall oil-polyol esters, the improvement comprising adding to said esters an hydroxy-, alkoxy aluminum acylate, and thereafter oxidizing the mass until the cement is formed.

18. In the production of linoleum cements, the improvement comprising adding to tall oil an oxo-aluminum acylate of a higher molecular fatty acid and thereafter oxidizing the mass until the cement is formed, whereby said aluminum compound is caused to react with the oxidized tall oil.

19. A linoleum compound having an oxidized oil content substantially all of which is an oxidized tall oil chemically modified by reaction with an aluminum compound defined in claim 1, said oxidized tall oil being obtained by agitating and blowing a tall oil product with an oxygen-containing gas at an elevated temperature.

20. A linoleum compound containing a filler, a pigment and an oxidized oil content substantially all of which is an oxidized tall oil chemically modified by reaction with an aluminum compound defined in claim 1, said oxidized tall oil being obtained by agitating and blowing a tall oil product with an oxygen-containing gas at an elevated temperature.

21. A linoleum compound containing a filler, pigment and an oxidized oil content substantially all of which is an oxidized tall oil chemically modified by reaction with an aluminum compound defined in claim 1, said aluminum compound having been added in an amount of from 0.1 of one percent up to a ratio of about 1:1 in relation to the tall oil content.

References Cited in the file of this patent

UNITED STATES PATENTS

| | | |
|---|---|---|
| 2,469,041 | Jones | May 3, 1949 |
| 2,582,833 | Hunn | Jan. 15, 1952 |
| 2,599,553 | Hotten | June 10, 1952 |
| 2,603,571 | Castellano | July 15, 1952 |
| 2,613,162 | Chatfield | Oct. 7, 1952 |
| 2,618,536 | Hunn | Nov. 18, 1952 |
| 2,618,596 | Minich | Nov. 18, 1952 |
| 2,663,649 | Winkler | Dec. 22, 1953 |
| 2,752,262 | Dunlap | June 26, 1956 |
| 2,786,773 | Bradley | Mar. 26, 1957 |
| 2,801,190 | Orthner et al. | July 30, 1957 |
| 2,835,685 | Rinse | May 20, 1958 |